(12) United States Patent
Maus et al.

(10) Patent No.: US 11,417,191 B2
(45) Date of Patent: Aug. 16, 2022

(54) IMPACT DETECTING AND TRACKING SYSTEMS AND METHODS FOR VEHICLE CRASH ATTENUATOR SYSTEMS

(71) Applicant: TRAFFIX DEVICES, INC., San Clemente, CA (US)

(72) Inventors: Geoffrey B. Maus, Mission Viejo, CA (US); Brent M. Kulp, San Clemente, CA (US); Arthur Koroghlian, Pasadena, CA (US); Bob L. Wielenga, Laguna Hills, CA (US)

(73) Assignee: TRAFFIX DEVICES, INC., San Clemente, CA (US)

( * ) Notice: Subject to any disclaimer, the term of this patent is extended or adjusted under 35 U.S.C. 154(b) by 0 days.

(21) Appl. No.: 17/119,955

(22) Filed: Dec. 11, 2020

(65) Prior Publication Data

US 2022/0005342 A1    Jan. 6, 2022

Related U.S. Application Data

(60) Provisional application No. 63/115,993, filed on Nov. 19, 2020, provisional application No. 62/947,451, filed on Dec. 12, 2019.

(51) Int. Cl.
*G08B 1/08* (2006.01)
*G08B 21/18* (2006.01)

(52) U.S. Cl.
CPC .................. *G08B 21/182* (2013.01)

(58) Field of Classification Search
CPC .................................................. G08B 21/182
USPC ....................................................... 340/539.1
See application file for complete search history.

(56) References Cited

U.S. PATENT DOCUMENTS

| | | | |
|---|---|---|---|
| 6,203,079 B1 | 3/2001 | Breed | |
| 6,343,821 B2 | 2/2002 | Breed | |
| 6,523,872 B2 | 2/2003 | Breed | |
| 6,539,175 B1 * | 3/2003 | Geary | E01F 15/146 404/6 |

(Continued)

FOREIGN PATENT DOCUMENTS

WO    2013100275 A1    7/2013

OTHER PUBLICATIONS

International Search Report and Written Opinion dated Mar. 23, 2021 in connection with corresponding International Pat. App. No. PCT/US20/64656.

*Primary Examiner* — Zhen Y Wu
(74) *Attorney, Agent, or Firm* — Stout, Uxa & Buyan, LLP; Donald E. Stout

(57) ABSTRACT

An impact tracking system includes a sensor module that mounts to a fixed crash attenuator, sign, guardrail, or other roadway devices installed along a roadway. When the crash attenuator or other asset is impacted by an errant vehicle, the impact tracker, comprising a sensor system, senses and captures the impact data and sends an alert message to a remote receiver. The receiver may comprise known data receiving means, such as computers or phone systems, which may receive emails, text messages, photos, and the like in real or near real time. Received data may be analyzed, stored, and/or re-transmitted to additional receivers, which may include road authorities, such as transportation departments responsible for inspecting and repairing the impact attenuators.

21 Claims, 4 Drawing Sheets

(56) References Cited

U.S. PATENT DOCUMENTS

| | | | |
|---|---|---|---|
| 6,812,855 B1* | 11/2004 | Sudou | G09F 13/04 340/602 |
| 7,819,604 B2* | 10/2010 | Breed | E01F 9/662 404/9 |
| 8,430,596 B2 | 4/2013 | McKenney et al. | |
| 9,822,503 B2 | 11/2017 | Maus et al. | |
| 10,041,218 B2* | 8/2018 | Sanchez De La Cruz | E01F 15/086 |
| 10,504,302 B1 | 12/2019 | Chavez et al. | |
| 2001/0024043 A1* | 9/2001 | Breed | E01F 15/148 293/119 |
| 2003/0165356 A1* | 9/2003 | Breed | B60R 19/00 404/6 |
| 2007/0235706 A1* | 10/2007 | Barton | E01F 15/145 256/69 |
| 2010/0097206 A1* | 4/2010 | Jung | E01F 15/0461 340/539.1 |
| 2010/0097208 A1* | 4/2010 | Rosing | G06Q 10/087 340/572.1 |
| 2012/0121325 A1* | 5/2012 | Buehler | E01F 15/088 404/6 |
| 2012/0234906 A1* | 9/2012 | Ganapathi | G06Q 20/3276 235/375 |
| 2013/0117078 A1 | 5/2013 | Weik et al. | |
| 2015/0052619 A1* | 2/2015 | Kwak | H04W 12/02 726/28 |
| 2016/0024731 A1* | 1/2016 | Sanchez De La Cruz | E01F 15/081 256/13.1 |
| 2017/0323227 A1* | 11/2017 | Sadeghi | G06Q 20/102 |
| 2018/0247573 A1* | 8/2018 | Gauthier | G09F 11/23 |
| 2018/0282958 A1* | 10/2018 | Impero | G01H 11/08 |
| 2018/0350239 A1* | 12/2018 | Hourdos | G08G 1/0116 |
| 2019/0126874 A1 | 5/2019 | Panigrahi et al. | |
| 2019/0234033 A1* | 8/2019 | Sanchez De La Cruz | E01F 15/085 |

\* cited by examiner

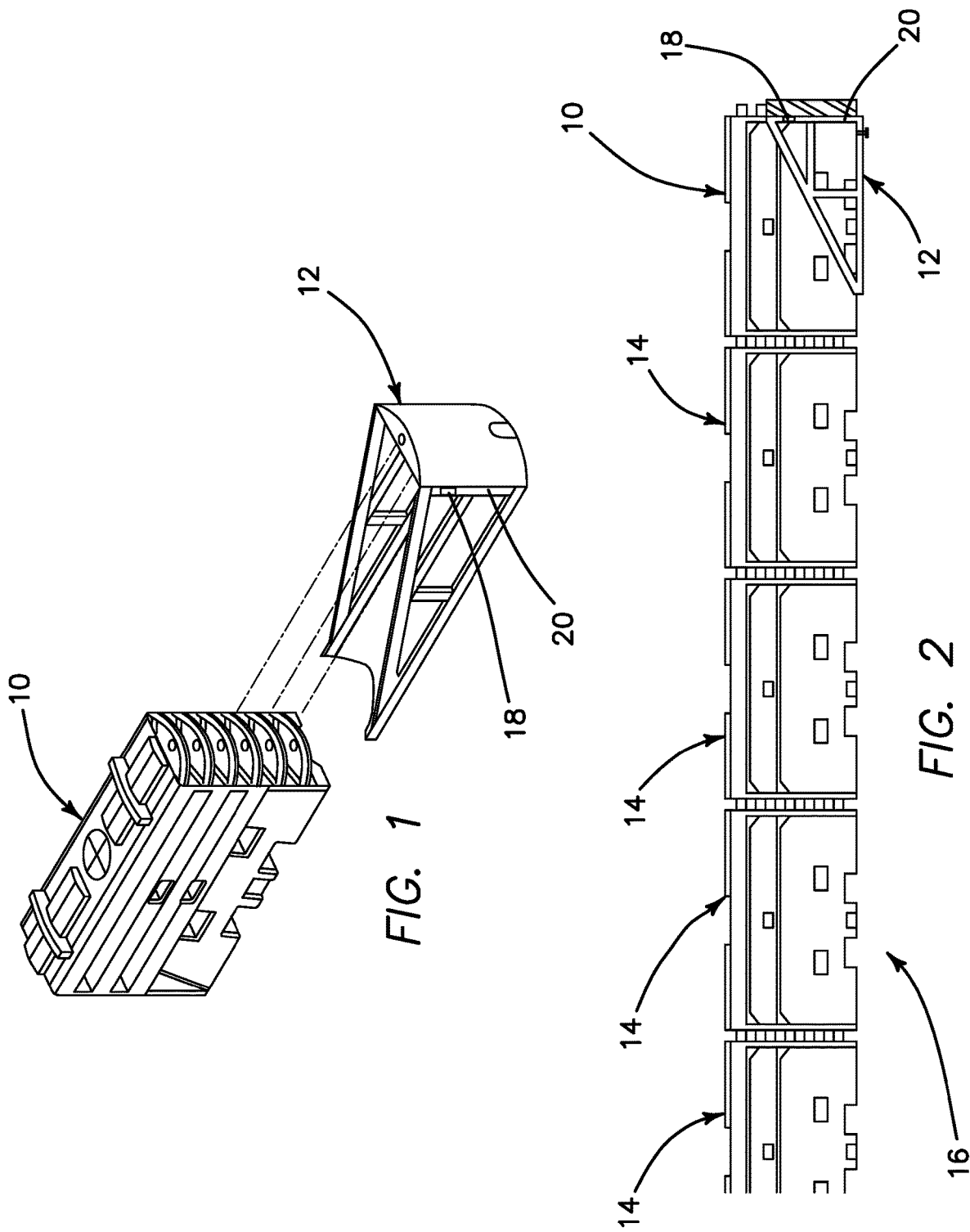

IMPACT DETECTING AND TRACKING SYSTEMS AND METHODS FOR VEHICLE CRASH ATTENUATOR SYSTEMS

This application claims the benefit under 35 U.S.C. 119(e) of the filing date of U.S. Provisional Application Ser. No. 62/947,451, entitled Impact Detecting and Tracking Systems and Methods for Vehicle Crash Attenuator Systems, filed on Dec. 12, 2019, and of U.S. Provisional Application Ser. No. 63/115,993, entitled Impact Detecting and Tracking Systems and Methods for Vehicle Crash Attenuator Systems, filed on Nov. 19, 2020. Each of the foregoing applications are commonly assigned with the present application, and are each expressly incorporated herein by reference, in their entirety.

BACKGROUND OF THE INVENTION

Vehicle crash attenuators and barricades, of both the stationary and vehicle-mounted types, are well known in the art. One such stationary vehicle crash attenuation system is disclosed in commonly assigned U.S. Pat. Nos. 8,430,596 and 9,822,503 as well as in U.S. Pat. No. 7,819,604, all three patents of which are herein expressly incorporated by reference, in their entirety.

A problem for highway agencies and contractors, related to vehicle crash attenuators and barricades, as well as roadside signs, guardrails, and the like, is that they become damaged from time to time, usually as a result of vehicular impacts which are unreported because they are of a minor nature or the driver of the impacting vehicle is negligent or impaired. Consequently, some of these roadside devices can become hazardous, because they are damaged to the extent that they can no longer perform their protective duties, especially in the case of crash attenuators, which may no longer effectively attenuate the forces of a vehicular crash, putting occupants of the impacting vehicle at risk of severe injury or death. Even if safety is not a pressing concern, such damage may result in a mis-located or unsightly roadside device.

Another issue that plagues such agencies and contractors is that they may have many roadside devices of the type noted above in place throughout their system of roadways and highways, and/or along the various construction sites for which they are responsible. Unless a careful inventory is maintained, there may not be reliable records as to where various ones of these assets are installed, what type of asset it is, and whether the installed assets are in operable condition.

Accordingly, it would be advantageous to have an asset tracking and management system, which is automated and which is capable of monitoring the status of each logged asset on a real-time basis, to improve cost-effective management of expensive traffic safety assets, and to ensure that installed assets are ready to perform the safety tasks for which they are intended.

SUMMARY OF THE INVENTION

The inventive system and methods meet the need for an effective, automated, and efficient traffic safety asset and management system. The system comprises an impact tracker device that mounts to a fixed crash attenuator, sign, guardrail, or other roadway devices installed along a roadway. The impact tracker device may also be utilized with vehicle-mounted crash attenuators, such as the SCORPION® truck and trailer mounted attenuators available from the applicant for the present application, TrafFix Devices, Inc. When the crash attenuator or other asset is impacted by an errant vehicle, the impact tracker, comprising a sensor system, senses and captures the impact data and sends an alert message to a remote receiver. The receiver may comprise known data receiving means, such as computers or phone systems, which may receive emails, text messages, photos, and the like in real or near real time.

Received data may be analyzed, stored, and/or re-transmitted to additional receivers, which may include road authorities, such as transportation departments responsible for inspecting and repairing the impact attenuators. Safety engineers use the impact data to understand quantity, location, and other information about accidents. Road design engineers can use the data to understand where road design flaws may be contributing to accidents, and to design safer roads. Attenuator manufacturers may use the data to validate or improve the performance of the attenuator. Asset managers may use the data to record the location, identity, and condition of crash attenuators in their districts of responsibility.

The impact detecting and tracking systems of the invention, in addition to motion and impact sensors, may employ camera systems for recording the actual impact, as well as, potentially, near misses to the attenuator. Speed of the impacting vehicle may be sensed, stored, and transmitted. The camera systems may also include license plate recognition and recording systems for ensuring that errant motorists are held accountable for damage that they cause.

More particularly, in a particular aspect of the invention there is provided a tracking and management system for roadway traffic safety assets, which comprises a sensor module securable to a particular asset. The sensor module comprises a housing, a processor, a communications transmitter, a power supply, and an impact detecting sensor. A communications receiver remote from the sensor module is adapted to receive a signal from the communications transmitter and to log information related to the signals into a database containing identifying information concerning the sensor module and the particular asset to which it is secured. The communications receiver is further adapted to display identifying information concerning the particular asset and the sensor module secured thereto.

The signal from the communications transmitter comprises an alarm triggered by an impact above a predetermined level sensed by the impact detecting sensor. The impact detecting sensor, in a particular embodiment, comprises an accelerometer.

The predetermined impact level triggering the impact detecting sensor is set to detect a likely damaging impact on the particular asset by a vehicle. In one particular embodiment, the predetermined impact level is 0.5G on an X-Y axis and 1.0G on a Z axis, but these predetermined levels are dependent upon the nature of the particular asset, its vulnerability to damaging impacts, its locations, and other factors.

In a particular illustrated embodiment, the processor comprises a low power cellular module. The communications transmitter comprises a cellular antenna. In certain embodiments, the sensor module further comprises a GPS locator, and the power supply comprises a battery, though other power sources, such as a solar panel, could potentially be used.

A scannable identifier may be disposed on the sensor module housing for providing a user with immediate information concerning the sensor module and its associated asset. In the illustrated embodiment, the scannable identifier comprises a QR code.

The communications receiver comprises a host server, the host server having a database for storing information regarding each asset and its associated sensor module, and further being adapted to display a dashboard presenting impact and management information regarding each asset and associated sensor module logged into the system, the dashboard being displayable on a screen directly connected to the host server, or on other devices logged into the host server and having suitable application software installed thereon.

In another aspect of the invention, there is disclosed a method of tracking and managing roadway traffic safety assets using sensor modules secured to or otherwise associated with each asset to be tracked and managed. The method comprises receiving an activation signal from a sensor module secured to a particular asset, logging the sensor module and the particular asset into a database, including information concerning the particular asset, its location, and a customer owning the particular asset, and receiving an alarm signal from the sensor module, indicating that an impact over a threshold value has been detected on the particular asset. A further step may comprise forwarding the alarm signal to a customer's mobile or computer device. An accelerometer may be utilized to detect the impact over a threshold value. The method provides for a further step of displaying a status for each of a plurality of assets upon receipt of an inquiry from a logged-in user.

The invention, together with additional features and advantages thereof, may best be understood by reference to the following description taken in conjunction with the accompanying illustrative drawing.

BRIEF DESCRIPTION OF THE DRAWINGS

FIG. 1 is an isometric view of an exemplary component of a vehicle crash attenuator device on which a sensor module constructed in accordance with the principles of the present invention has been secured;

FIG. 2 is a plan view of the exemplary vehicle crash attenuator device shown in FIG. 1 disposed in a typical array of such devices on a roadway, for the protection of a fixed structure, such as a bridge abutment or the like;

DETAILED DESCRIPTION OF THE INVENTION

Figure 3:
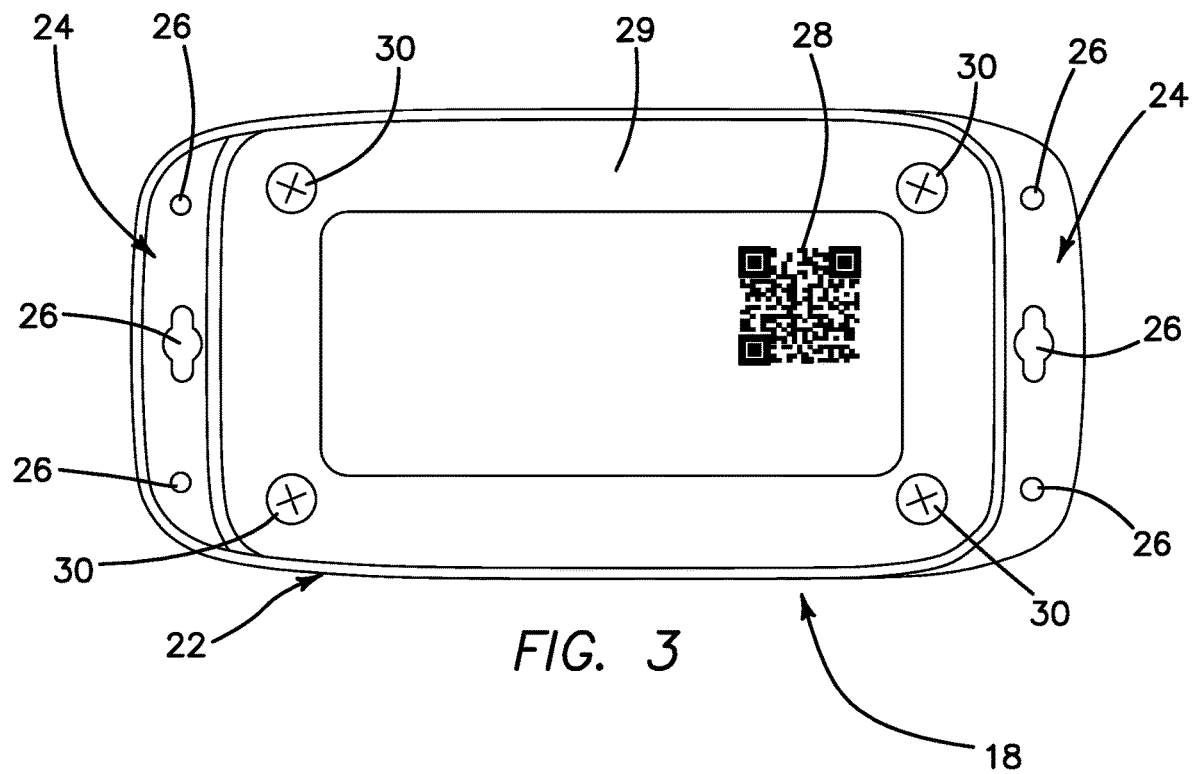
FIG. 3 is a top view of an exemplary embodiment of the sensor module shown in FIGS. 1 and 2.

With reference now to the drawings, and particularly to FIGS. 1 and 2, there is shown a barrier module 10 which is positioned with the confines of a frame structure 12, as illustrated. FIG. 2 shows the barrier module 10 and frame structure 12 joined to additional barrier modules 14 to form a crash attenuator array 16 that may be placed in front of and secured to a fixed structure, such as a concrete abutment or the like (not shown). The barrier modules 10, 12 are formed of hollow plastic and may be filled with a dispersible ballasting material, such as water or sand, though the barrier module 10, disposed within the confines of the frame structure 12, is typically kept empty in arrays 16 of the type shown. The crash attenuator array 16 is commercially available from the applicant for the present invention, TrafFix Devices, Inc., of San Clemente, Calif., and is sold under the trademark SLED®.

An impact tracking or sensor module 18 may be mounted on a desired location on the crash attenuator array, as illustrated in FIGS. 1 and 2, wherein the sensor module 18 is mounted on a vertical frame member 20 of the frame structure 12. The mounting location is not critical, and is selected based on desired factors, such as visibility, cellular network signal strength, protection from direct impacts during a crash, and the like. For example, the sensor module 18 could be mounted on other frame locations on the frame structure 12, or on any desired location on the barrier modules 10, 12.

It should also be noted that the crash attenuator array 16 is merely representative of a host of crash attenuators, both stationary and vehicle-mounted, and other roadside safety devices, including, but not limited to, barricades, channelizers, signs and sign stands, and the like, on which the sensor module 18 may be deployed. For the remaining portions of this application, for ease of reference, the term "asset" shall be used to refer to any and all of these traffic safety devices.

FIG. 3 illustrates an exemplary embodiment of the sensor module 18, which may be formed of a plastic housing 22 having mounting flanges 24 with fastener or mounting holes 26 for securing the housing 22 to a desired location on the asset 16. A scannable identifier 28, such as the illustrated QR code, or other suitable identifying means, is disposed on an outside surface of the housing 22 for easy access. Scanning the identifier 28 using the camera function on a mobile device, for example, takes the user directly to the portal/dashboard 60 in the software system for the purpose of managing the device. While it may be preferable, as noted above, to position the housing 22 to minimize its exposure to likely vehicular impacts, the housing 22 is engineered to survive direct vehicular impacts and to maintain operation.

Figure 4:
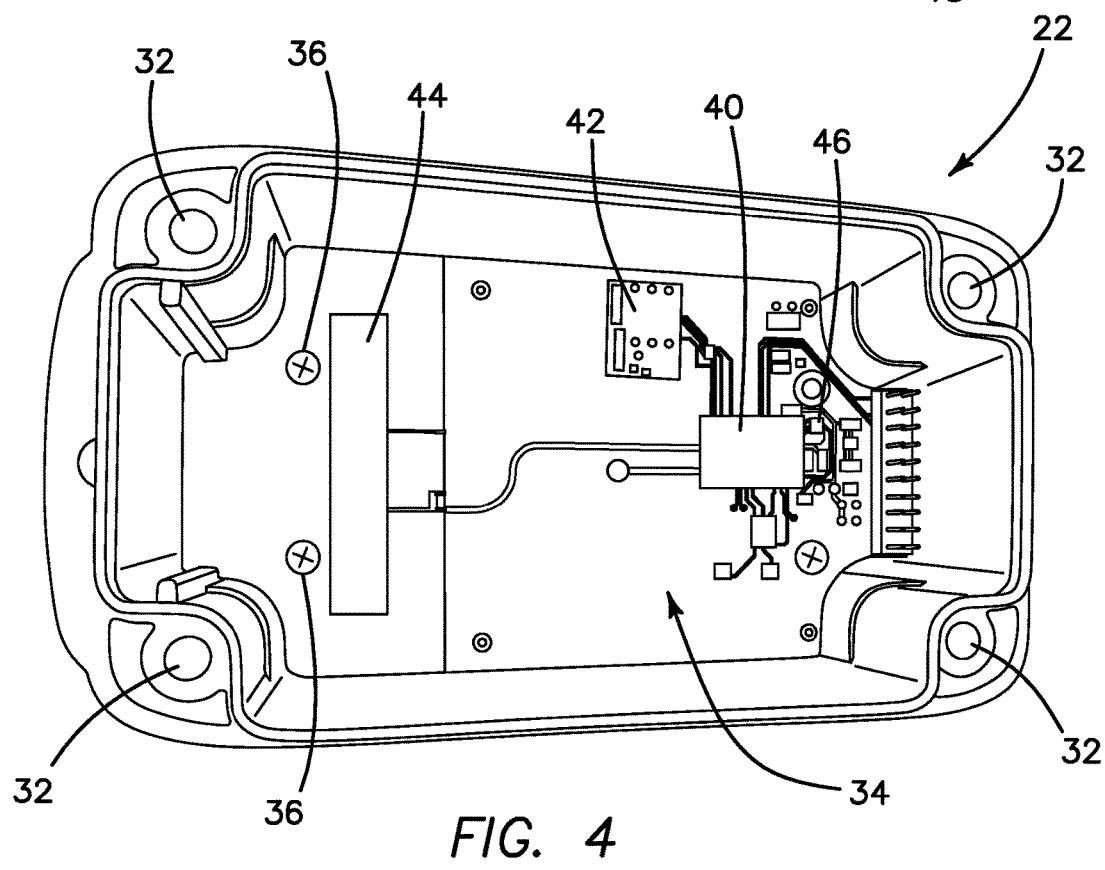
FIG. 4 is a top view of the sensor module of FIG. 3 wherein the cover of the module has been removed to reveal a processor board which is programmed to perform desired functions of the sensor module.
Figure 5:
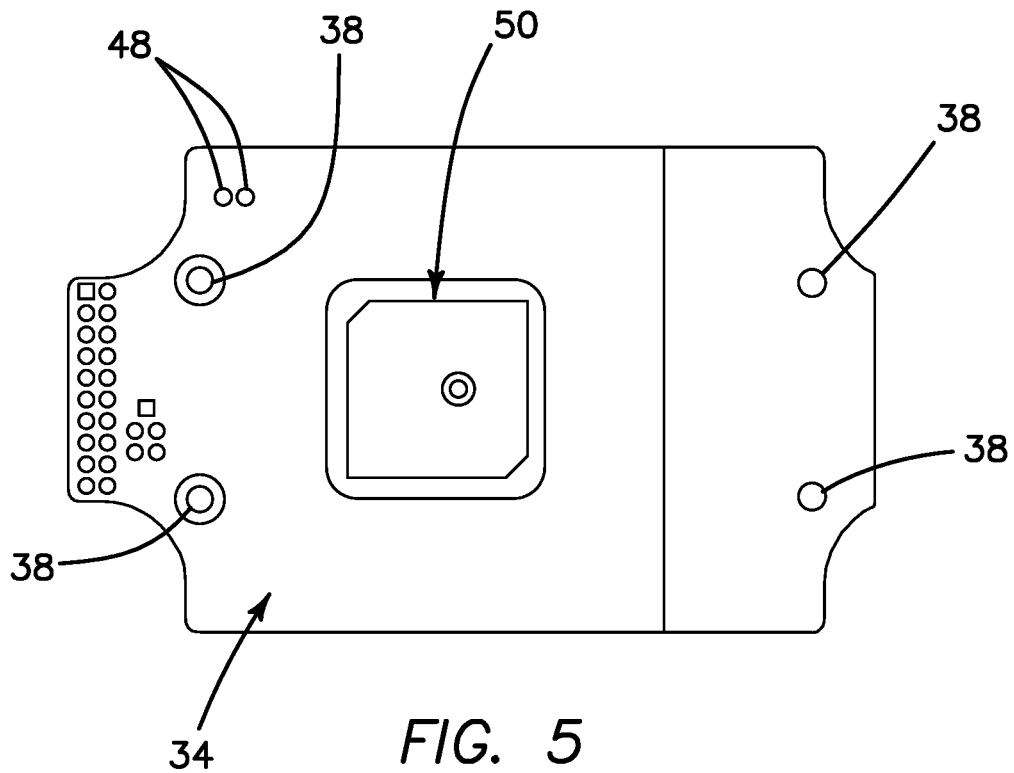
FIG. 5 is a bottom view of the processor board of FIG. 4.

FIG. 4 shows the sensor module housing 22, wherein a top portion 29 of the housing has been removed by removing the fasteners 30 from within fastener receptacles 32. With the top housing portion 29 removed, a processor board 34 is visible within the housing 22, mounted thereto by fasteners 36, through holes 38 (FIG. 5). FIG. 5 illustrates the reverse side of the processor board 34, removed entirely from the housing 22 for clarity.

The sensor module 18 includes, in the illustrated exemplary embodiment, a low power cellular module or communications module 40 designed for engagement with the Internet of Things (IoT). The communications module 40 is adapted to be programmed as the processor for storing software and the operating system for the module. Communication from the sensor module 18 to receiving devices is important for providing real-time data of impacts, battery life, and malfunctions, though, of course, any means of providing such communication, whether using existing or future cellular networks, WiFi where available, or communications networks yet unknown which may become known and used in the future, may be used within the metes and bounds of the invention. Again, in the illustrated exemplary embodiment, a SIM card holder 42, connectable to up to three different networks, a cellular antenna 44, and an accelerometer 46 are provided, which together program the sensor module 18, store memory of impacts, events, and alarms, sense and measure strength of impacts to the sensor module 18 and the asset to which it is attached. On the back of the board 34, contact holes 48 for a battery connector and a GPS antenna 50 are visible. A lithium battery (not shown) can power the module 18 for up to five years, and is easily replaceable. The result is a self-contained compact device that is weatherproof and durable, monitors the asset to which it is attached 24/7, is easily attached to most assets, and is powered by a 5-year lifespan battery.

There is a manual on/off switch on the module 18, which may be inside the housing for security purposes, for powering the device on and off directly. Powering the device on outdoors will activate the GPS locator in the device to obtain a GPS location. A recalibrate control icon is available on the software dashboard for calibrating GPS information which may have been lost on a particular managed device.

Figure 6:
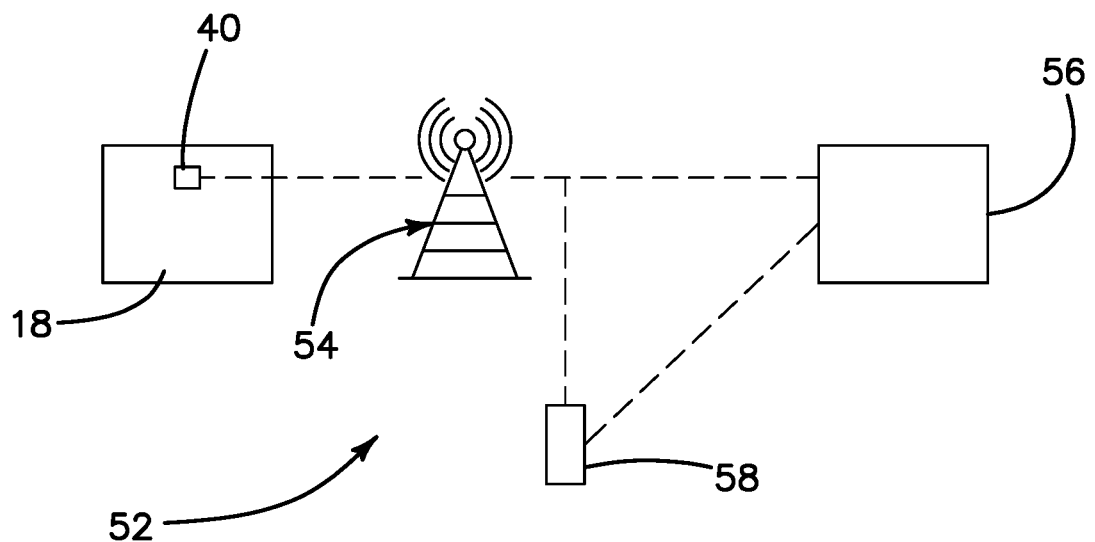
FIG. 6 is a schematic drawing of an exemplary operating method for the system of the invention.

FIG. 6 is a simple schematic diagram of the operation of an exemplary embodiment of the inventive asset monitoring system 52. The system 52 comprises the above-described sensor module 18, including the communications processor 40 which accesses a suitable communications network 54, such as a cellular network, for both outgoing and incoming communications. Signals from the sensor module 18, passing through the network 54, may be delivered to a host server 56, and/or to a user's communications device 58, such as a cell phone or computer, either directly or via the host server 56. The alarm signal may be sent simultaneously to multiple mobile and desktop devices, with the exact location of the impacted asset(s).

Figure 7:
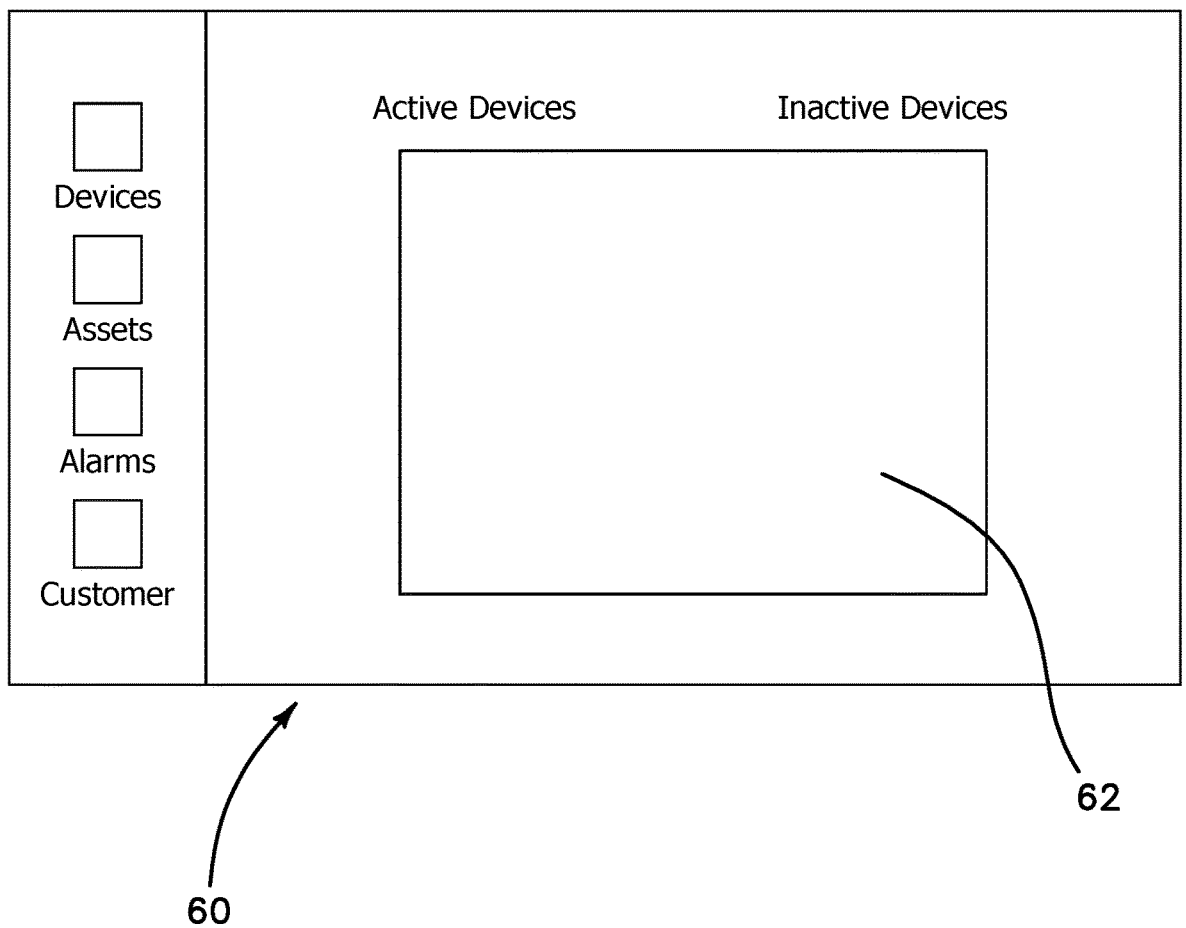
FIG. 7 is a schematic view of an exemplary form of a user interface dashboard for the system of the invention.

FIG. 7 is a simple schematic diagram showing an exemplary representation of a dashboard 60 for viewing assets managed by the system 52. The dashboard 60 may have a display screen portion 62 including, for example, a map showing active and/or inactive asset locations, and information about selected assets and sensor devices or modules 18, alarms, and customer information.

In operation, in an exemplary mode, the impact tracker system of the invention is programmed and designed to provide immediate notification to parties responsible for a particular roadside asset, such as crash cushions, signs, guardrails, and other roadside devices, of a vehicular impact or other important event. For example, upon impact by a vehicle to the asset on which an activated sensor module 18 is mounted, the accelerometer or other applicable sensor determines whether the impact exceeds predetermined threshold values likely to trigger significant damage to the asset. In one particular embodiment, those predetermined threshold values are 0.5G on the X-Y axis and 1.0G on the Z axis, but of course those predetermined threshold values may be adjusted depending upon the nature of the asset and its vulnerability to damaging impacts.

When such a threshold impact has been detected, the communications system of the sensor module 18 is activated and an alert is sent through the communications system 54 to the host server 56, where it is logged, and forwarded to designated users 58. In some embodiments, the alert may also be sent directly to the designated users 58, as shown in FIG. 6. The alert may be in the form of an email or text message, or other appropriate means. The dashboard 60, desired forms of which may appear on displays connected to the host server 56, and on user interfaces 58, will display the alert, the nature and magnitude of the sensed impact, and the location of the asset involved, on a map, by address, or in some other suitable format. At some point after the logged impact, the asset can be inspected, physically, or via photographs of the device uploaded to the software database and then viewed by a software user, to determine whether it is still effectively functional or needs replacement or repair. If repair or replacement is required, the status of the asset can be updated in the software database, for example, to a red color. Once the repair or replacement has occurred, the status can be updated again to green.

When a sensor module 18 is installed on a particular asset, and the asset is placed in service, an initialization routine may be instituted by activating the sensor module 18, during which the module 18 connects to a locally available communications network, seeks a GPS signal to document its location, and sends an initialization message to the dashboard 60 on the host server 56. At this point, the asset management system on the host server 56 logs the asset and the sensor module 18 as active in the system. The sensor module 18 then goes into sleep mode until a triggering impact is sensed. Other functions programmed into the sensor module 18 may include transmitting periodic signals to the host server indicating that it is still online and its battery strength, and responding to inquiries, of a periodic, automated nature, or those manually initiated, received from the server as to its status. When the module 18 is installed, with its associated asset, the installer may upload a photograph which will also be stored in the database on the host server. In some embodiments, the uploading of the photograph may serve to activate the asset in the system, and the photograph will later be available to identify visually the nature of the asset should an alarm be activated.

Occasionally, a false impact will be detected by the system. Such a false impact might be caused by road vibrations, earthquakes, weather conditions, or improper mounting of the sensor module 18. Visual inspection will identify an improper or loose mounting, which can be addressed by re-mounting the sensor module 18 securely. However, if the asset is placed in a construction work zone, or in an area routinely prone to heavy vibration, a slider on the asset page of the software user interface may be utilized to tune the sensitivity of the accelerometer appropriately, in this case by lowering its sensitivity. In other instances, it may be desirable to increase the asset's sensitivity remotely to best fit a specific application. The slider can be set between Low (least sensitive) and High (most sensitive), with Medium being the recommended setting for most applications.

The inventive system permits re-assignment of sensor modules 18 from one asset to a different asset. In some instances, the old asset will be removed from the system because it is no longer operational, and the module re-initiated after mounting on the new asset, while in other cases the asset may be archived to retain asset history, photos, notes, and the like in the database.

In particular embodiments of the invention, the hardware, comprising the sensor module 18 and associated components, may be sold to the customer, while the asset management system is made available as Software-As-A-Service (SAAS), for a periodic subscription fee, the software being hosted and maintained on the host server and accessed by the customer through an established account with log-in credentials. Of course, other approaches, such as downloadable licensed asset management software, could be made available if desired. As noted above, software applications may be downloaded onto users' mobile phones or computers for real-time access to alarms and other asset management information. Functionality may be included with these software applications to enable the customer to toggle particular assets between an active and deactivated status.

The inventive asset management system is capable of doing much more than impact tracking. It is useful even simply as an asset management tool, logging and maintaining a database of active and inactive assets, deployed and in storage yards, including types of assets, their status, and their condition. Financial accounting modules may be incorporated into the asset management software to utilize in billing the customer on a per unit basis for pricing subscriptions, if desired, or for use by the customer in billing its own customers for deployed assets. The system may also be programmed to conduct a health check of each asset and associate module periodically, such as once per day, either by pinging the module for a response, or by programming the module to automatically "check-in" by sending a signal, via text or email, for example, to designated receivers on a desired schedule. If no health check signal is received on the pre-arranged schedule, the status of the asset can be evaluated to see if communication has been lost, a battery is low, or if there is some other reason, such as an undetected impact and associated damage, for the module's failure to check in.

The inventive asset tracking and management system is capable of tracking and recording any asset's installation date, manufacturer's make and model, site location, installer's information and notes, and impact and inspection history, all from the user's computer or mobile device.

While the illustrated embodiment does not incorporate a camera, it is within the scope of the invention to include one or more cameras on or associated with the module 18, which can be operated and programmed to visually monitor the installation on command or in response to a threshold impact signal sensed by the module 18. In this case, it may sometimes not be necessary to send a worker to the site to perform the inspection of the asset after such an alarm, but rather, the damage may be assessed by inspecting photographs automatically uploaded by the module 18, or generated by commands sent to the module subsequent to the impact.

The software/database end of the inventive system is designed, in certain applications, to be a multi-tenant system, wherein the tenant maintains the software and database on the host server and subscribers or software licensees are sub-tenants. The sub-tenants are responsible for monitoring alarms, and for managing and responding to alerts from their assets.

Accordingly, although exemplary embodiments and features of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A tracking and management system for roadway traffic safety assets, comprising:
a sensor module securable to a particular asset, at a particular fixed location on a roadside, the sensor module comprising a housing enclosing a processor, a communications transmitter, a power supply, and an impact detecting sensor; and
a communications receiver remote from the sensor module, the communications receiver being adapted to receive a signal from the communications transmitter and to log information related to the signals into a database containing identifying information concerning the sensor module and the particular asset to which the sensor module is secured, the communications receiver further being adapted to display identifying information concerning the particular asset and the sensor module secured thereto, the signal from the communications transmitter comprising an alarm triggered by an impact above a predetermined level sensed by the impact detecting sensor, the predetermined level sensed by the impact detecting sensor being adjustable by a user, wherein the communications receiver comprises a host server, the host server having a database for storing information regarding each asset and the sensor module secured to each asset, and further being adapted to display a dashboard presenting impact and management information regarding each asset and associated sensor module logged into the system, the dashboard being displayable on a screen directly connected to the host server, or being displayable on screens of other devices logged into the host server and having suitable application software installed thereon; wherein the particular asset remains at the same particular fixed location both before and after the sensed impact.

2. The tracking and management system as recited in claim 1, wherein the impact detecting sensor comprises an accelerometer.

3. The tracking and management system as recited in claim 1, wherein the predetermined impact level triggering the impact detecting sensor is set to detect a likely damaging impact on the particular asset by a vehicle.

4. The tracking and management system as recited in claim 3, wherein the predetermined impact level is 0.5G on an X-Y axis and 1.0G on a Z axis.

5. The tracking and management system as recited in claim 1, wherein the processor comprises a low power cellular module.

6. The tracking and management system as recited in claim 5, wherein the communications transmitter comprises a cellular antenna.

7. The tracking and management system as recited in claim 1, wherein the sensor module further comprises a GPS locator.

8. The tracking and management system as recited in claim 7, and further comprising a scannable identifier on the sensor module housing for providing a user with immediate information concerning the sensor module and the sensor module's associated asset.

9. The tracking and management system as recited in claim 8, wherein the scannable identifier comprises a QR code.

10. The tracking and management system as recited in claim 8, wherein the scannable identifier is adapted to direct a device scanning the scannable identifier to the dashboard.

11. The tracking and management system as recited in claim 1, wherein the power supply comprises a battery.

12. The tracking and management system as recited in claim 1, wherein the dashboard is adapted to display a slider for tuning the impact detecting sensor to adjust the predetermined level sensed by the impact detecting sensor.

13. The tracking and management system as recited in claim 1, and further comprising a manual power switch enclosed within the housing of the sensor module.

14. A method of tracking and managing roadway traffic safety assets using sensor modules secured to or otherwise associated with each asset to be tracked and managed, comprising:
receiving an activation signal from a sensor module secured to a particular roadway traffic safety asset;
logging the sensor module and the particular asset into a database, including information identifying the particular asset, a current location of the particular asset, and a customer responsible for the particular asset;

receiving and logging an alarm signal from the sensor module, indicating that an impact above a threshold value has been detected on the particular asset, wherein the particular asset remains in the same particular fixed location after the detected impact;

forwarding information concerning the alarm signal to the customer responsible for the particular asset; and displaying information concerning the particular asset to a logged-in user when the logged-in user scans an identifier disposed on the sensor module, the displayed information including control functions which permit the logged-in user to manage the particular asset.

15. The method as recited in claim 14, and further utilizing an accelerometer to detect the impact above a threshold value.

16. The method as recited in claim 14, and further displaying a status for each of a plurality of assets upon receipt of an inquiry from a logged-in user.

17. The method as recited in claim 14, and further comprising a step of receiving and logging photographs of the particular asset into the database.

18. The method as recited in claim 17, wherein the step of receiving and logging photographs of the particular asset into the database occurs after receipt of an alarm signal concerning the particular asset, the method further comprising reviewing the logged photographs to ascertain any damage to the particular asset requiring repair or replacement.

19. The method as recited in claim 18, and further comprising a step of adding an indicator in the database that a particular asset is damaged, the indicator being displayed to a logged-in user viewing information from the database to advise the logged-in user of a need to repair or replace the particular asset.

20. The method as recited in claim 14, and further comprising tuning a sensitivity level of the accelerometer between a low level and a high level responsive to ambient vibration levels and other conditions at the current location of the particular asset.

21. The method as recited in claim 14, and comprising a further step of deactivating a sensor module in the database when it is removed from a particular asset, and re-activating the sensor module in the database when it is installed on a different particular asset.

\* \* \* \* \*